3,196,778
HANDLING OF CURED TOBACCO
Frederick T. Edridge, P.O. Box 293,
Marandellas, Southern Rhodesia
Filed July 10, 1963, Ser. No. 294,136
9 Claims. (Cl. 100—3)

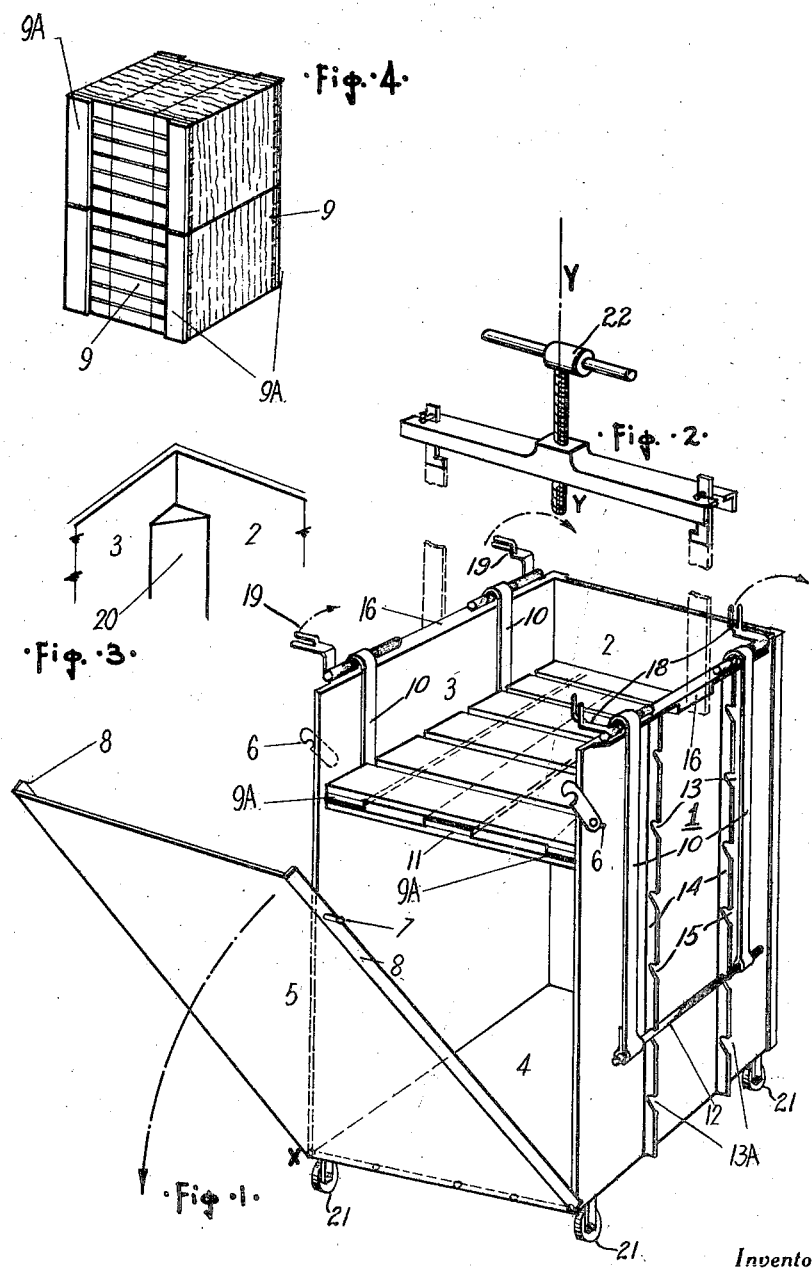

The invention relates to the handling or processing of tobacco after curing in convenient manner appropriate to the type of tobacco, e.g. whether Turkish or flue-cured, e.g. Virginia, as received from the curing stage, and including the bulking of the tobacco prior to the grading thereof. It provides an improved method and apparatus which while suitable for the baling of graded tobacco leaves for shipment without use and disadvantages of hessian or string, a paper wrapping sufficing in such case, is primarily intended for the economical bulking of ungraded tobacco for storage in a manner especially economical in storage space besides obviating or very considerably reducing damage to or other depreciation of the quality of the leaf such as occurs when bulking is performed in accordance with present practices.

Applied to bulking in bales, the invention militates against mould development, staining and the sticking together of leaves arising from excessive pressures applied in the baling and/or arising within a bale from the weight of its own contents or of one or more other such bales stacked thereon, which excessive pressures, however caused, interfere with the quiet, event continuation of air-conditioning of the leaves which is important in bringing the leaf into suitable and substantially uniform condition for the subsequent grading operation.

Other advantages of the invention will become apparent in the following description.

According to this invention I provide a bulking method in which the cured leaves may be transferred directly from the tobacco sticks, strings or other such supporting means, in what can be practiced as a single movement, into a receiver for building up methodically therein and with negligible handling in layers to a suitable baleable number or quantity, and in which such quantity may then be subjected in the receiver to a desired moderate uniformly applied compression to form a bale of the leaves, which bale includes the tobacco sandwiched, bound sufficiently by and protected between a pair of relatively inexpensive wooden members which have served respectively as the relatively moveable "top" and "bottom" members in the baling press which is provided jointly by them and the four side walls of the receiver.

Enabled by the baling method outlined in the preceding paragraph, is the mode of storing or stacking the bales of tobacco coming from the press, by placing such bales in a suitable stowage space on a floor and/or one bale on top of another in any number of tiers with the aforesaid "top" and "bottom" members of the respective bales arranged substantially upright and so that the weight of the tobbaco sandwiched between them is taken at least mainly by such members instead of being transmitted wholly through the tobacco leaf itself to the supporting floor and/or to tobacco contained in lower tiers of a stack built high to economise in stowage floor space.

The invention also consists in apparatus for baling tobacco leaf whether for economical bulking in accordance with the next but one preceding paragraph, or for shipment of graded tobacco; comprising a receiver in the form of a four-sided rectangular box with an open top and at least one of its sides openable from the others or the remaining side, a generally flat rectangular wooden member separately constructed from the box and adapted to be entered into the open top thereof so as to form a false bottom therein while being arrestable at a series of different levels in its descent therewithin, whereby it may be lowered in stages towards the box base as tobacco leaves are deposited layer upon layer in ordered fashion and orientations on said member and always with the already laid tobacco in convenient close proximity to the upper edges of the open box until the required quantity or number of leaves has thus been packed for subsequent application of the desired baling pressure; and a further member of a like kind and function to the first applicable into the box over the complete charge of tobacco therein, upon which further member the desired baling pressure head can be applied to form a bale which then includes both members for binding suitably about the sandwiched tobacco within the box, and for easy removal therefrom through a side or sides opened for that purpose and closeable again for the next similar baling operation utilising a further pair of the "top" and "bottom" members.

With the bales containing the tobacco leaves methodically laid laminarly and substantially flat and uncrumbled, and baled in this condition, it will be understood that when such bales are stacked as explained the laminae of leaves then lie upright, a condition which both substantially equalises the pressure experienced by the individual leaves within each bale and also promotes efficient "breathing" or ventilation and uniformity of conditioning, admitting thus also of the baling of already highly conditioned leaf.

Each bale comprising two of the "top" and "bottom" members, it is necessary that such be of very cheap construction, although of adequate strength for their duties. In their preferred construction they are composed of cheap low-grade wood laths or slats, fixed in crosswise arrangements to achieve the necessary strength; and it is further desirable that the resultant articles be of openwork, lattice or duckboard form in order that they can, while further permitting ventilation of the tobacco in the bales, exert between them a sufficient frictional grip on the sandwich of tobacco to prevent its falling out between the ends as the bound bale is being transported from the press and while bales are stacked in the arrangement aforementioned, i.e. with the laminae of leaves upright.

Damage to the corners of baled tobacco during and subsequent to removal from the baling device can be readily prevented in the baling method. Thus the "top" and "bottom" members are made of the complementary cornered rectangular outline to the bore of the receiver, whereas during the laminar packing or charging of the leaves into the latter and the pressing and binding operations the effective cross-section or bore of the receiver has the sharp corners filled, to result in the tobacco "sandwich" having liberally bevelled corners, protected by the protruding or overhanging sharp corners of the "top" and "bottom" members. This result is obtainable as by inserting fillets of desired cross-section in the corners of the receiver to keep the tobacco out of such corners during the charging of the receiver and during the pressing operation. Such fillets are made telescopic as necessary in order not to obstruct the downments of the "top" member under the press head; and such fillets can leave the receiver with the tied sandwiches of baled tobacco, to be easily stripped therefrom for re-use in the next, similar baling operation.

Adverting to the baling method and device, any suitable means such as rods or the like passed across the box-like receiver through any of a series of holes distributed in its walls at suitable intervals of height, may be used for the progressive lowering of a "bottom" wooden member while the leaves are being charged in laminations on it. Likewise clips or other means may be arranged adjacent to the receiver top along any of its edges for holding the sticks or the like in convenient positions for methodical and expeditious unloading straight into the receiver. Also, an openable receiver side is hinged preferably to the others at its base, whereby it may be lowered outwardly, so as itself to provide a ramp on which to slide out the bales, as they are tied, on to a truck or the like for taking away for storage.

A single press head may also be kept in efficient service if a number of the receivers are provided as part of the baling installation and such receivers are provided as they may be with wheels, castors or the like enabling them as and when they have been charged to be moved selectively to the one press head for the baling proper and then moved away from it to enable it to be used on the next prepared receiver.

Strapping or wiring of the bales inside the receiver can be effected in any of the known and convenient ways, e.g. by wire or steel binding strip passed round the outsides, in this case, of the "tops" and "bottoms", the latter preferably having notches or other devices for the correct positioning of the wires or strips, and this operation may be facilitated by first opening the side or sides of the receiver.

The invention is illustrated by way of example only in the accompanying drawings, in which:

FIGURE 1 is a perspective view of the aforementioned container or box in which the tobacco is charged and baled;

FIGURE 2 is a perspective view, incomplete, of a means of attaching a portable press to a charged box;

FIGURE 3 is a fragmentary detail of a box corner fitment; and

FIGURE 4 illustrates the method of stacking bales produced by the method and apparatus described.

In FIGURE 1 three sides 1, 2, 3 of an open-topped stout steel plate box having a base or floor 4 and welded and reinforced at the corners has its fourth side 5 hinged at x—x for raising that side from a fully lowered position to complete the box and be secured in place by catches as 6 fitting about pegs as 7 projecting from flanges as 8 when the latter then fit over the edges of the sides 1 and 3. The floor 4 may be provided with castors 21.

Reference 9 denotes a slatted wooden member which is to form the first inserted one, or "bottom" member of the sandwich of tobacco built upon it inside the closed box. The member 9 of which the underside battens as 9a form an integral part is shown supported in its near-uppermost position for reception of the first parts of the charge of tobacco leaves. It is suspended thus by flexible straps 10 which are attached to or passed across the underside of an auxiliary base plate or board 11 offering a central support to the relatively flexible slats of the member 9. The straps are brought up the insides of the box sides 1 and 3 and over their edges to pass downwardly on their outsides for attachment to cross-bars, as 12. These bars are engageable as shown in corresponding level pairs of notches or slots as 13 presented at desired regular intervals along pairs of angle iron flanges as 14 fixed up the box sides.

In its uppermost or initial position the member 9 is supported by the straps 10 from the lowest notches as 13a and it can be lowered in requisite stages as the charging of tobacco proceeds, by shifting the bars 12 step by step into progressively higher notches.

When the required charge has been packed upon the receded member 9, a second slatted member for the sandwich, identical with member 9, is inserted in inverted condition into the box to rest on the tobacco, and the load is then lowered by the straps to rest on the firm bottom 4 of the box and is then ready for the desired degree of compression.

The separate and portable device shown in FIGURE 2 is assumed to support at y—y through its centre or at other points within its span any suitable construction of hydraulic press or jack 22 or more than one thereof for operating downwardly upon the upper one of the slatted sandwich members. Essentially the device shown comprises a stout steel or like cross-bar 15 adapted to be laid down across the box top as a bridge over the welded-on or other projections 16 and be anchored securely down on it against reaction of the press pressure by hooks 17 which catch under the said projections.

Adverting to parts appearing above the top edges of the baling box, references 18, 18 and 19, 19 are forked arms which are pivotally connected as shown to the opposing box sides 1 and 3 and can be swung from the setting in which arms 18, 18 appear on the near side of the box, so as then to overlie the open top, to an outward setting such as is indicated in the case of 19, 19, clear of the box top for ready admission of the slatted members as 9 aforementioned. With both sets of arms in their inward positions the opposite pairs, i. e. 18, 19 near the rear side 2 and the other such pair near the front or hinged side 5 provide supports by which the loaded sticks of tobacco leaf from the barns can be supported with the hanging leaves laid out directly on the member 9 or on leaves already packed thereon, expeditiously in even and orderly fashion with minimum handling, as they are detached from the sticks or clips which, when emptied, are replaced by further loaded sticks or clips for continuing the preparation of the box for the pressing.

Forked or like stick-supporting and unloading arms or their equivalents may if desired be provided at three or all four sides of the box, enabling the charging to be done even more quickly by several operators working together in orderly rotation.

Where the run of the slats of the members as 9 is arranged in the box as the drawing shows it will be appreciated that after the wiring of the sandwich-bale under the press pressure in a convenient manner, and after releasing the press and detaching it from the box, when the side 5 is unlatched and opened out flat, the bale, tilted out on to it, and conveniently with it, is already in the position where the slats lie horizontally and therefore in the best position for gripping the tobacco sandwich frictionally against drooping, sagging or slipping from between the slatted wooden members. As they come from the baling box the bales are thus already in the optimum condition and orientation also for stacking upon one another whether on a transport vehicle or in the bulk storage shed or other space.

In FIGURE 3, reference 20 denotes a fillet temporarily occupying a corner of the box to serve the already described purpose of excluding the tobacco leaf charge from the corner regions of the bale so that it is protected by the overlying corners of the wooden end members 9.

FIGURE 4 shows a pair of the wire-bound bales, laid one on top of the other, and how the batten parts 9a take the weight of the bales from one to the other without transmission of any, or any appreciable part, of the weight of the leaves in the upper bale to the leaves in the bale or bales beneath it.

I claim:

1. A tobacco bulking method comprising transferring cured tobacco leaves directly from tobacco sticks, strings or other such supporting means, as a single movement into a baling press having a baling chamber with top and bottom pressure applying members for building up methodically the cured leaves in layers to a suitable baleable quantity, subjecting such quantity in the chamber to a desired moderate uniformly applied compression and sandwiching said tobacco between a pair of wooden members which have served respectively as the relatively moveable top and bottom members in the baling press and then applying binding around the top and bottom members and the leaves to form a bale.

2. A method according to claim 1 comprising stacking the bales of tobacco formed in said press in a suitable stowage space in tiers with the aforesaid top and bottom members of the respective bales arranged substantially upright and so that the weight of the tobacco sandwiched between them is taken at least mainly by such members instead of being transmitted wholly through the tobacco leaf itself to the supporting floor or to tobacco contained in lower tiers of a stack.

3. Apparatus for baling tobacco leaf comprising a receiver in the form of a four-sided rectangular box with an open top and at least one openable side, a removable pressure applying head, a substantially flat rectangular first wooden member adapted to be entered into said open top to form a false bottom therein, means for holding said member at a series of different levels in its descent therewithin so that it may be lowered in stages towards the box base as tobacco leaves are deposited layer upon layer on said member and always with the already laid tobacco in convenient close proximity to the upper edges of the open box until the required quantity of leaves has been packed; and a second member similar to said first applicable into the box over the complete charge of tobacco therein, the pressure applying head when positioned on said box applying pressure to form a bale which is then bound to include both members about the sandwiched tobacco within the box, and is easily removed from said box through said openable side which is then closed again for the next similar baling operation.

4. Apparatus as claimed in claim 3 wherein said members are of openwork form so that they can, while further permitting ventilation of the tobacco in the bales, exert between them a sufficient frictional grip on the sandwich of tobacco to prevent its falling out between the ends as the bound bale is being transported from the press.

5. Apparatus as claimed in claim 3 comprising fillet means included inside said box during charging thereof and subsequently removable from the bales.

6. Apparatus as claimed in claim 3 wherein said first member is supported at adjustable levels in said receiver by flexible straps.

7. Apparatus according to claim 3, comprising clips arranged adjacent to the receiver top along any of its edges for holding the sticks for unloading straight into the receiver.

8. Apparatus according to claim 3 in which said openable side is hinged at its base, whereby it may be lowered outwardly to provide a ramp on which to extract the bales.

9. Apparatus according to claim 3 wherein said receiver is provided with casters.

References Cited by the Examiner

UNITED STATES PATENTS

| 307,812 | 11/84 | Smith | 100—228 |
| 427,426 | 5/90 | Jones. | |
| 630,372 | 8/99 | Lowry | 100—85 |
| 1,113,625 | 10/14 | Heim | 100—228 |
| 1,136,119 | 4/15 | Glenn | 100—228 X |
| 1,250,310 | 11/17 | Haugh | 100—228 |
| 1,985,448 | 12/34 | Hayes. | |
| 2,119,956 | 6/38 | McDonnell | 100—2 X |
| 2,711,255 | 6/55 | Ashley. | |

FOREIGN PATENTS 901,534  12/55  Germany.

WALTER A. SCHEEL, *Primary Examiner.*